US012781311B2

(12) United States Patent
Monaghan et al.

(10) Patent No.: US 12,781,311 B2
(45) Date of Patent: Nov. 3, 2026

(54) ALLOY COMPOSITIONS AND ARTICLES FORMED OF SUCH COMPOSITIONS

(71) Applicant: GE Vernova Infrastructure Technology LLC, Greenville, SC (US)

(72) Inventors: Elizabeth Angelyn Monaghan, Milford, MI (US); Tom Battiste, Greenville, SC (US); Jason Robert Parolini, Anderson, SC (US)

(73) Assignee: GE Vernova Infrastructure Technology LLC, Greenville, SC (US)

(*) Notice: Subject to any disclaimer, the term of this patent is extended or adjusted under 35 U.S.C. 154(b) by 0 days.

(21) Appl. No.: 18/898,009

(22) Filed: Sep. 26, 2024

(65) Prior Publication Data

US 2026/0085386 A1 Mar. 26, 2026

(51) Int. Cl.
*C22C 19/05* (2006.01)
*F01D 5/28* (2006.01)

(52) U.S. Cl.
CPC .............. *C22C 19/057* (2013.01); *F01D 5/28* (2013.01); *F05D 2300/175* (2013.01)

(58) Field of Classification Search
CPC ........................................................ F01D 5/28
See application file for complete search history.

(56) References Cited

U.S. PATENT DOCUMENTS

| | | | | |
|---|---|---|---|---|
| 2,725,692 A | 12/1955 | Andreae | | |
| 3,146,136 A * | 8/1964 | Bird | C22C 19/00 | 148/419 |
| 3,526,499 A * | 9/1970 | Collins | C22C 19/00 | 164/122 |
| 4,461,659 A | 7/1984 | Harris | | |
| 5,043,138 A * | 8/1991 | Darolia | C23C 30/00 | 428/614 |
| 5,725,692 A | 3/1998 | DeLuca et al. | | |
| 6,632,299 B1 | 10/2003 | Harris | | |
| 10,221,468 B2 | 3/2019 | Dial et al. | | |
| 10,724,122 B2 | 7/2020 | Dimatteo et al. | | |
| 2002/0164263 A1* | 11/2002 | Harris | C22C 19/057 | 148/428 |

FOREIGN PATENT DOCUMENTS

| | | | | |
|---|---|---|---|---|
| AU | 630623 B2 * | 11/1992 | C22F 1/10 |
| DE | 102010037046 A1 | 3/2011 | |
| EP | 1184473 A2 | 3/2002 | |
| WO | 2018183066 A1 | 10/2018 | |

OTHER PUBLICATIONS

Zhu "Influence of Hf and MC Carbide on Transverse Platform in Single Crystal Grain Selection of 2D Grain Selector". Materials, 15, 6274 (Year: 2022).*
Materials article (Year: 2022).*
Written Opinion and International Search Report for PCT Application No. PCT/US2025047342 mailed Feb. 5, 2026; 12 pp.

* cited by examiner

*Primary Examiner* — Brian O Peters
(74) *Attorney, Agent, or Firm* — Armstrong Teasdale LLP

(57) ABSTRACT

Described herein are compositions, and more particularly to alloy compositions, methods of using the alloy compositions, and articles formed from with the alloy compositions. The alloy compositions are broadly applicable in applications requiring superalloys, including welding processes, additive manufacturing processes, metal casting processes, coating processes, repairing processes, powder metallurgy, and/or combinations thereof.

16 Claims, 16 Drawing Sheets

ALLOY COMPOSITIONS AND ARTICLES FORMED OF SUCH COMPOSITIONS

BACKGROUND

The field of the disclosure relates generally to compositions, and more particularly to alloy compositions, methods of using the alloy compositions, and articles formed from the alloy compositions. The alloy compositions are broadly applicable in applications requiring superalloys, including welding processes, additive manufacturing processes, metal casting processes, coating processes, repairing processes, powder metallurgy, and/or combinations thereof.

Many nickel-based superalloys include a relatively high hafnium content of at least 0.9 wt %, and more commonly at least 1.3 wt %. This relatively high hafnium content is often necessary to provide desirable properties in nickel-based superalloys. For example, hafnium content may play a critical role in solidification behavior during casting processes, such as investment casting processes. However, superalloys including such relatively high hafnium content are expensive and, in many cases, not commercially viable.

Moreover, nickel-based superalloys that entirely lack hafnium or contain a relatively low hafnium content of less than 0.2 wt % do not provide sufficient properties for many applications requiring superalloys.

Accordingly, there is a need for nickel-based superalloys that contain relatively low hafnium content while also providing good physical properties.

BRIEF DESCRIPTION

In one aspect, a composition is provided. The composition includes from about 0.2 wt % to about 0.7 wt % hafnium, from about 4.0 wt % to about 5.5 wt % tantalum, from about 8 wt % to about 10 wt % tungsten, from about 0.06 wt % to about 0.1 wt % carbon, one or more of cobalt, chromium, aluminum, titanium, molybdenum, boron, and zirconium, and balance nickel and incidental impurities.

In another aspect, a method of using a composition is provided. The composition includes from about 0.2 wt % to about 0.7 wt % hafnium, from about 4.0 wt % to about 5.5 wt % tantalum, from about 8 wt % to about 10 wt % tungsten, from about 0.06 wt % to about 0.1 wt % carbon, and one or more cobalt, chromium, aluminum, titanium, molybdenum, boron, and zirconium, and balance nickel and incidental impurities. The method includes using the composition for a purpose selected from welding, additive manufacturing, metal casting, coating, repairing, powder metallurgy, and combinations thereof.

In still another aspect, an article including a composition is provided. The composition includes from about 0.2 wt % to about 0.7 wt % hafnium, from about 4.0 wt % to about 5.5 wt % tantalum, from about 8 wt % to about 10 wt % tungsten, from about 0.06 wt % to about 0.1 wt % carbon, one or more of cobalt, chromium, aluminum, titanium, molybdenum, boron, and zirconium, and balance nickel and incidental impurities.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1A:
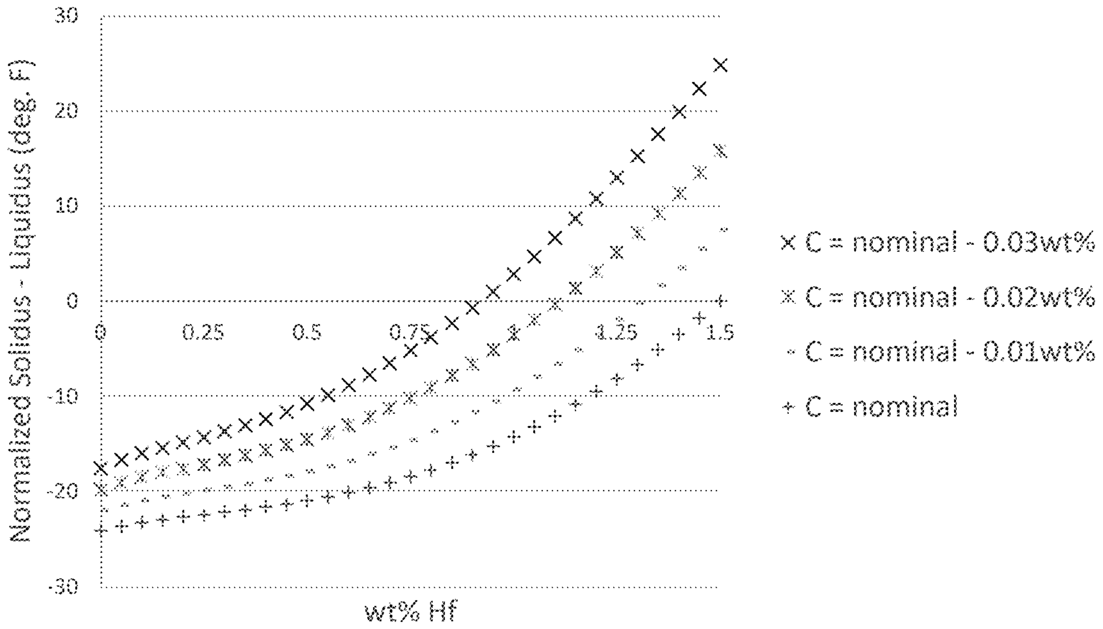
FIG. 1A depicts exemplary results of a computational evaluation of normalized solidus minus liquidus for wt % hafnium and nominal carbon comparative compositions and compositions in accordance with the present disclosure.
Figure 1B:
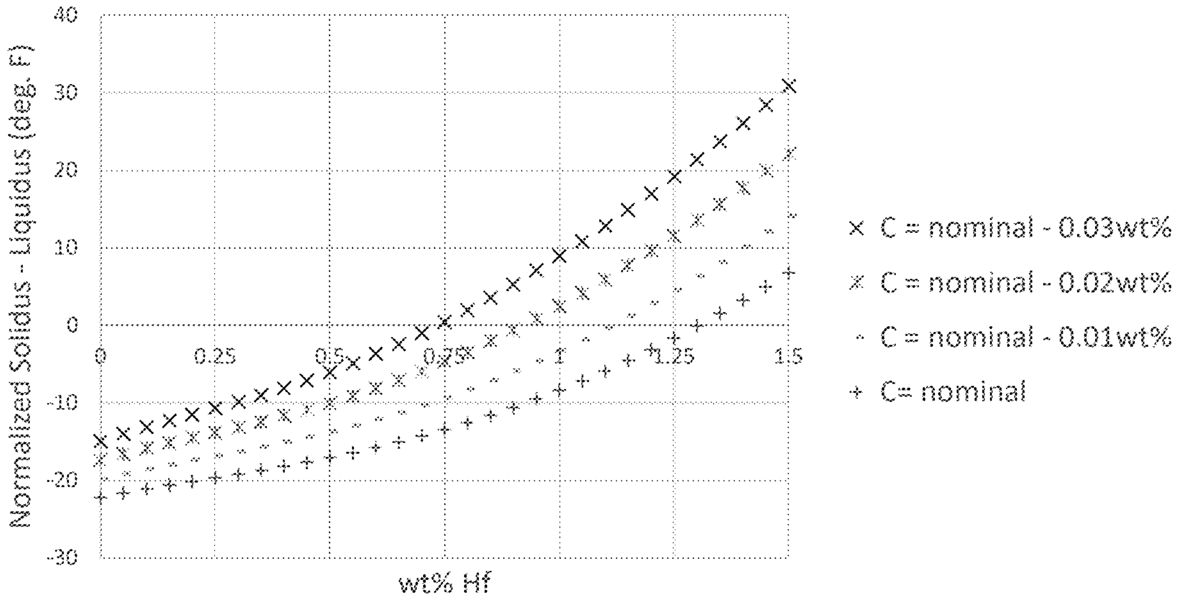
FIG. 1B depicts exemplary results of a computational evaluation of normalized solidus minus liquidus for wt % hafnium and nominal carbon at 1 wt % tantalum comparative compositions and compositions in accordance with the present disclosure.
Figure 1C:
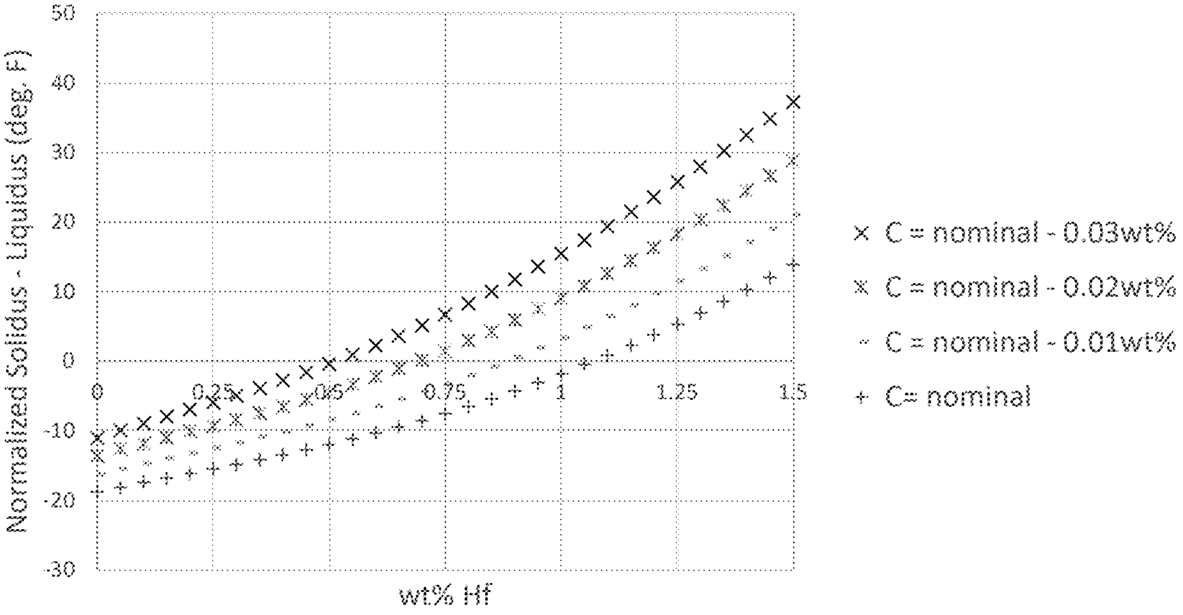
FIG. 1C depicts exemplary results of a computational evaluation of normalized solidus minus liquidus wt % hafnium and nominal carbon at 2 wt % tantalum comparative compositions and compositions in accordance with the present disclosure.
Figure 1D:
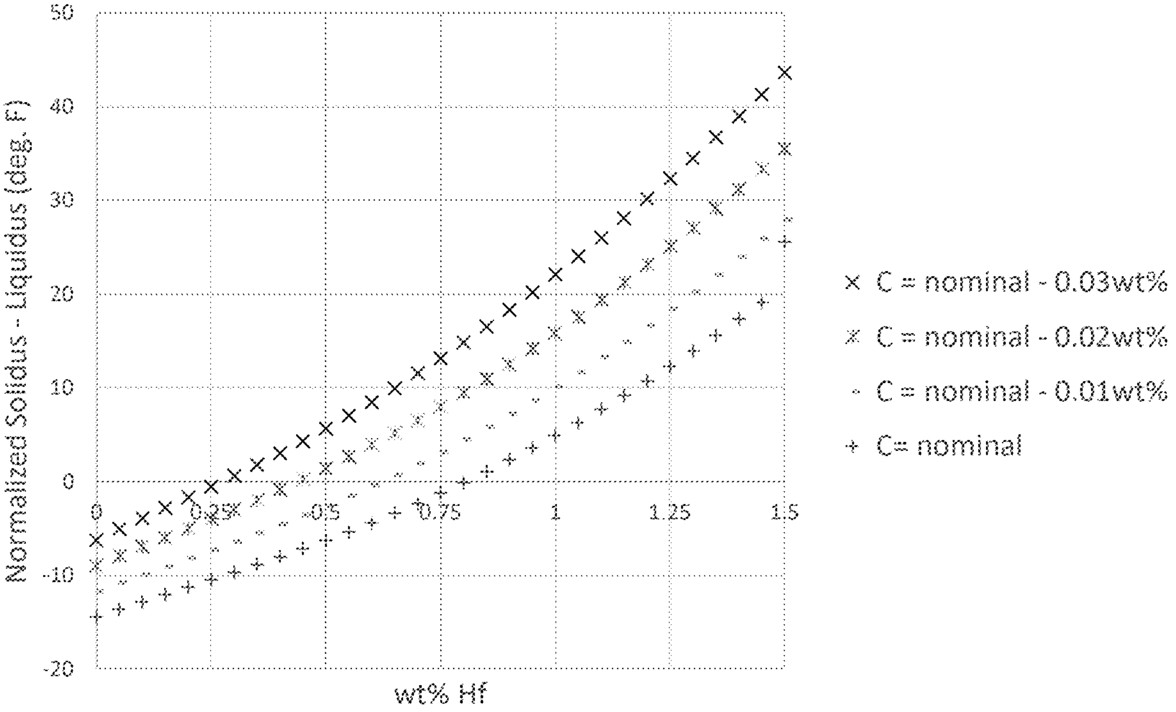
FIG. 1D depicts exemplary results of a computational evaluation of normalized solidus minus liquidus wt % hafnium and nominal carbon at 3 wt % tantalum comparative compositions and compositions in accordance with the present disclosure.
Figure 2A:
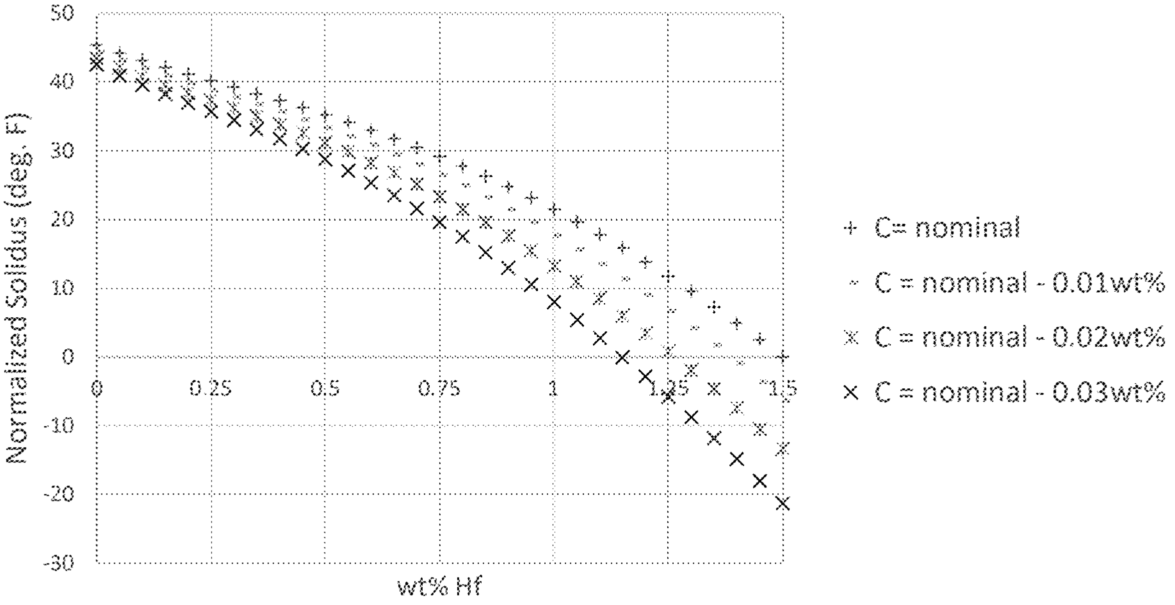
FIG. 2A depicts exemplary results of a computational evaluation of normalized solidus for wt % hafnium and nominal carbon comparative compositions and compositions in accordance with the present disclosure.
Figure 2B:
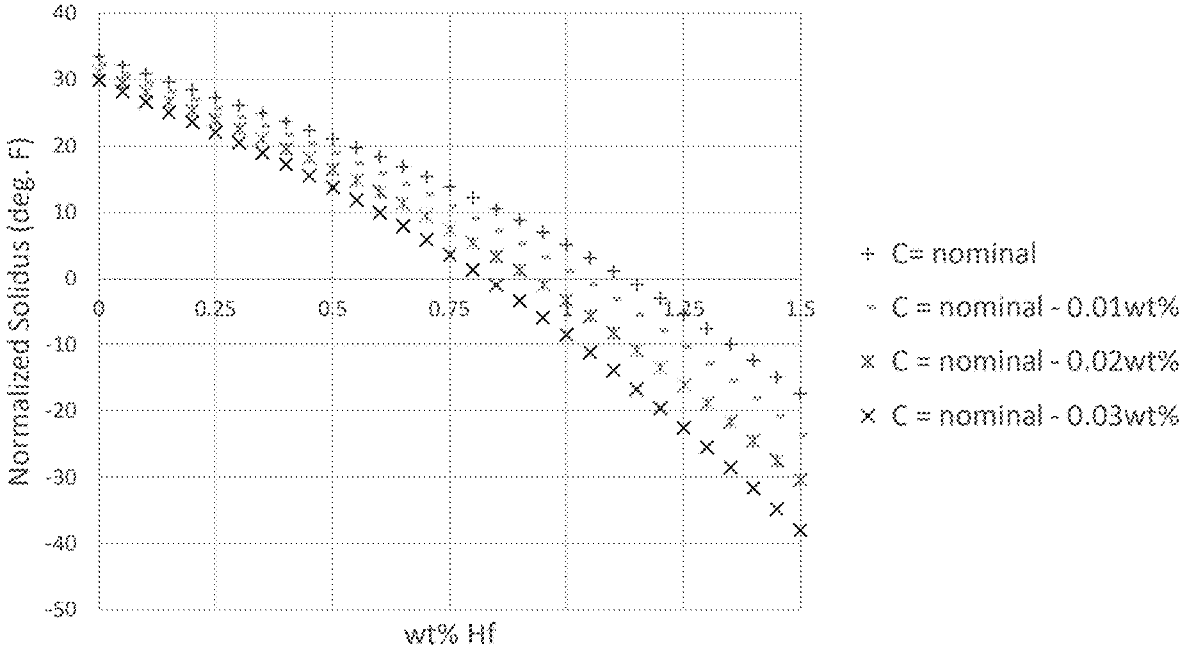
FIG. 2B depicts exemplary results of a computational evaluation of normalized solidus for wt % hafnium and nominal carbon at 1 wt % tantalum comparative compositions and compositions in accordance with the present disclosure.
Figure 2C:
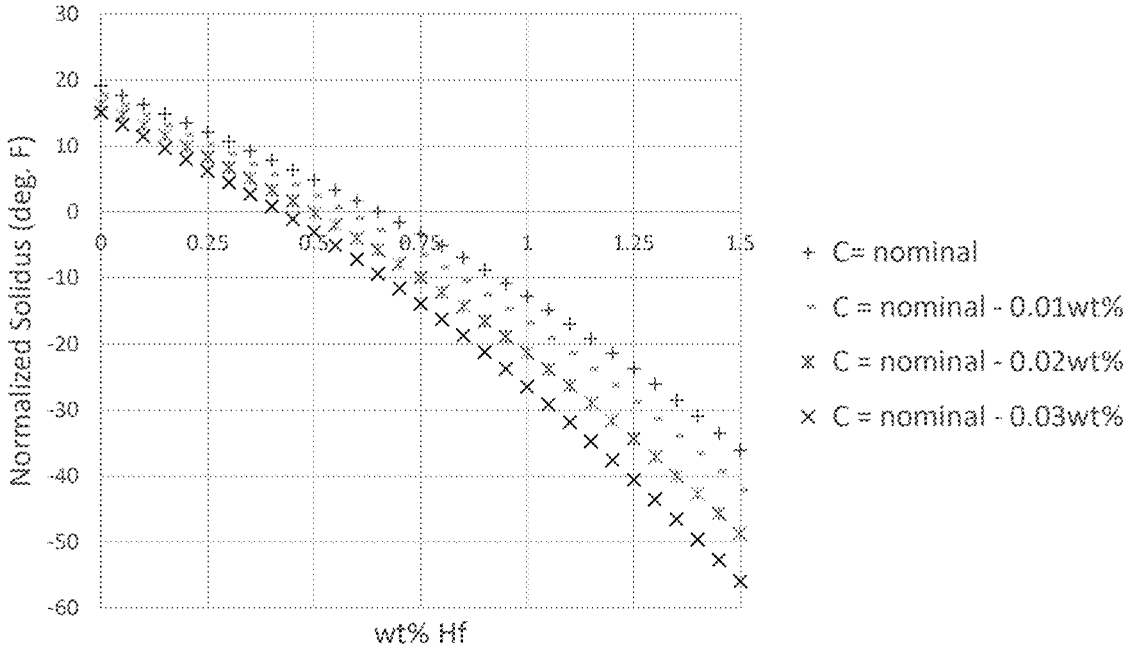
FIG. 2C depicts exemplary results of a computational evaluation of normalized solidus for wt % hafnium and nominal carbon at 2 wt % tantalum comparative compositions and compositions in accordance with the present disclosure.
Figure 2D:
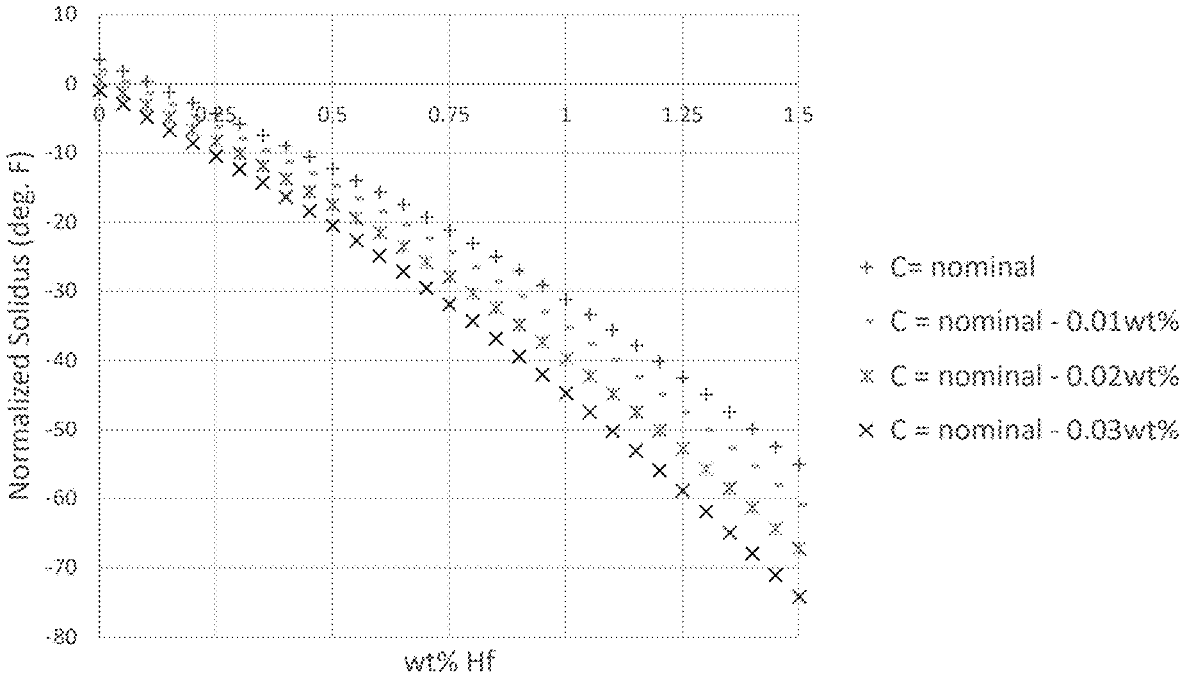
FIG. 2D depicts exemplary results of a computational evaluation of normalized solidus for wt % hafnium and nominal carbon at 3 wt % tantalum comparative compositions and compositions in accordance with the present disclosure.

It was discovered in the present disclosure that compositions according to the present disclosure could be used for high temperature applications. The compositions exhibit excellent physical properties due to a combination of relatively low hafnium content and a mixture of particular Ta, W, and C content. Compositions according to the present disclosure are broadly applicable in applications requiring superalloys, including welding, additive manufacturing, metal casting, coating, repairing, powder metallurgy, and combinations thereof.

Compositions according to the present disclosure are broadly applicable in applications requiring superalloys, including, but not limited to, welding, additive manufacturing, metal casting, coating, repairing, powder metallurgy, and combinations thereof.

The embodiments described herein overcome at least some of the disadvantages of known nickel-based superalloys. The exemplary embodiments described herein include a composition. The composition includes from about 0.2 wt % to about 0.7 wt % hafnium, from about 4.0 wt % to about 5.5 wt % tantalum, from about 8 wt % to about 10 wt % tungsten, from about 0.06 wt % to about 0.1 wt % carbon, one or more of cobalt, chromium, aluminum, titanium, molybdenum, boron, and zirconium, and balance nickel and incidental impurities.

In some embodiments, the composition may include any suitable amount of hafnium (Hf) that facilitates the composition described herein. In some embodiments, the composition contains Hf. In some embodiments, the composition includes from about 0.2 wt % to about 0.7 wt % Hf. In some embodiments, the composition includes from about 0.3 wt % to about 0.5 wt % Hf.

In some embodiments, the composition includes at least about 0.2 wt % Hf, at least about 0.25 wt % Hf, at least about 0.3 wt % Hf, at least about 0.35 wt % Hf, at least about 0.4 wt % Hf, at least about 0.45 wt % Hf, at least about 0.5 wt % Hf, at least about 0.55 wt % Hf, at least about 0.6 wt % Hf, or at least about 0.65 wt % Hf. In some embodiments, the composition includes at most about 0.25 wt % Hf, at most about 0.3 wt % Hf, at most about 0.35 wt % Hf, at most about 0.4 wt % Hf, at most about 0.45 wt % Hf, at most about 0.5 wt % Hf, at most about 0.6 wt % Hf, at most about 0.65 wt % Hf, or at most about 0.7 wt % Hf.

In some embodiments, the composition may include any suitable amount of tantalum (Ta) that facilitates the composition described herein. In some embodiments, the composition includes Ta. In some embodiments, the composition includes from about 4.0 wt % to about 5.5 wt % Ta. In some embodiments, the composition includes from about 4.0 wt % to about 5.0 wt % Ta.

In some embodiments, the composition includes at least about 4.0 wt % Ta, at least about 4.1 wt % Ta, at least about 4.2 wt % Ta, at least about 4.3 wt % Ta, at least about 4.4 wt % Ta, at least about 4.5 wt % Ta, at least about 4.6 wt % Ta, at least about 4.7 wt % Ta, at least about 4.8 wt % Ta, at least about 4.9 wt % Ta, at least about 5.0 wt % Ta, at least about 5.1 wt % Ta, at least about 5.2 wt % Ta, at least about 5.3 wt % Ta, or at least about 5.4 wt % Ta. In some embodiments, the composition includes at most about 4.1 wt % Ta, at most about 4.2 wt % Ta, at most about 4.3 wt % Ta, at most about 4.4 wt % Ta, at most about 4.5 wt % Ta, at most about 4.6 wt % Ta, at most about 4.7 wt % Ta, at most about 4.8 wt % Ta, at most about 4.9 wt % Ta, at most about 5.0 wt % Ta, at most about 5.1 wt % Ta, at most about 5.2 wt % Ta, at most about 5.3 wt % Ta, at most about 5.4 wt % Ta, or at most about 5.5 wt % Ta.

In some embodiments, the composition may include any suitable amount of tungsten (W) that facilitates the composition described herein. In some embodiments, the composition includes W. In some embodiments, the composition includes from about 8.0 wt % to about 10.0 wt % W. In some embodiments, the composition includes from about 8.5 wt % to about 9.7 wt % W.

In some embodiments, the composition includes at least about 8.0 wt % W, at least about 8.1 wt % W, at least about 8.2 wt % W, at least about 8.3 wt % W, at least about 8.4 wt % W, at least about 8.5 wt % W, at least about 8.6 wt % W, at least about 8.7 wt % W, at least about 8.8 wt % W, at least about 8.9 wt % W, at least about 9.0 wt % W, at least about 9.1 wt % W, at least about 9.2 wt % W, at least about 9.3 wt % W, at least about 9.4 wt % W, at least about 9.5 wt % W, at least about 9.6 wt % W, at least about 9.7 wt % W, at least about 9.8 wt % W, or at least about 9.9 wt % W. In some embodiments, the composition includes at most about 8.1 wt % W, at most about 8.2 wt % W, at most about 8.3 wt % W, at most about 8.4 wt % W, at most about 8.5 wt % W, at most about 8.6 wt % W, at most about 8.7 wt % W, at most about 8.8 wt % W, at most about 8.9 wt % W, at most about 9.0 wt % W, at most about 9.1 wt % W, at most about 9.2 wt % W, at most about 9.3 wt % W, at most about 9.4 wt % W, at most about 9.5 wt % W, at most about 9.6 wt % W, at most about 9.7 wt % W, at most about 9.8 wt % W, at most about 9.9 wt % W, or at most about 10.0 wt % W.

In some embodiments, the composition may include any suitable amount of carbon (C) that facilitates the composition described herein. In some embodiments, the composition includes C. In some embodiments, the composition includes from about 0.06 wt % C to about 0.1 wt % C. In some embodiments, the composition includes from about 0.07 wt % C to about 0.09 wt % C.

In some embodiments, the composition includes at least about 0.06 wt % C, at least about 0.065 wt % C, at least about 0.07 wt % C, at least about 0.075 wt % C, at least about 0.08 wt % C, at least about 0.085 wt % C, at least about 0.09 wt % C, or at least about 0.095 wt % C. In some embodiments, the composition includes at most about 0.65 wt % C, at most about 0.7 wt % C, at most about 0.75 wt % C, at most about 0.8 wt % C, at most about 0.85 wt % C, at most about 0.9 wt % C, at most about 0.95 wt % C, or at most about 0.1 wt % C.

In some embodiments, the composition may include any suitable amount of cobalt (Co) that facilitates the composition described herein. In some embodiments, the composition does not include Co. In some embodiments, the composition includes Co. In some embodiments, the composition includes from about 9 wt % to about 10 wt % cobalt.

In some embodiments, the composition includes at least about 9.0 wt % Co, at least about 9.1 wt % Co, at least about 9.2 wt % Co, at least about 9.3 wt % Co, at least about 9.4 wt % Co, at least about 9.5 wt % Co, at least about 9.6 wt % Co, at least about 9.7 wt % Co, at least about 9.8 wt % Co, or at least about 9.9 wt % Co. In some embodiments, the composition includes at most about 9.1 wt % Co, at most about 9.2 wt % Co, at most about 9.3 wt % Co, at most about 9.4 wt % Co, at most about 9.5 wt % Co, at most about 9.6 wt % Co, at most about 9.7 wt % Co, at most about 9.8 wt % Co, at most about 9.9 wt % Co, or at most about 10.0 wt % Co.

In some embodiments, the composition may include any suitable amount of chromium (Cr) that facilitates the composition described herein. In some embodiments, the composition does not include Cr. In some embodiments, the composition includes Cr. In some embodiments, the composition includes from about 8 wt % to about 8.7 wt % chromium.

In some embodiments, the composition includes at least about 8.0 wt % Cr, at least about 8.1 wt % Cr, at least about 8.2 wt % Cr, at least about 8.3 wt % Cr, at least about 8.4 wt % Cr, at least about 8.5 wt % Cr, or at least about 8.6 wt % Cr. In some embodiments, the composition includes at most about 8.1 wt % Cr, at most about 8.2 wt % Cr, at most about 8.3 wt % Cr, at most about 8.4 wt % Cr, at most about 8.5 wt % Cr, at most about 8.6 wt % Cr, or at most about 8.7 wt % Cr.

In some embodiments, the composition may include any suitable amount of aluminum (Al) that facilitates the composition described herein. In some embodiments, the composition does not include Al. In some embodiments, the composition includes Al. In some embodiments, the composition includes from about 5.25 wt % to about 5.75 wt % aluminum.

In some embodiments, the composition includes at least about 5.25 wt % Al, at least about 5.3 wt % Al, at least about 5.35 wt % Al, at least about 5.4 wt % Al, at least about 5.45 wt % Al, at least about 5.5 wt % Al, at least about 5.55 wt % Al, at least about 5.6 wt % Al, at least about 5.65 wt % Al, at least about 5.7 wt % Al, or at least about 5.74 wt % Al. In some embodiments, the composition includes at most about 5.3 wt % Al, at most about 5.35 wt % Al, at most about 5.4 wt % Al, at most about 5.45 wt % Al, at most about 5.5 wt % Al, at most about 5.55 wt % Al, at most about 5.6 wt % Al, at most about 5.65 wt % Al, at most about 5.7 wt % Al, or at most about 5.75 wt % Al.

In some embodiments, the composition may include any suitable amount of titanium (Ti) that facilitates the composition described herein. In some embodiments, the composition does not include Ti. In some embodiments, the composition includes Ti. In some embodiments, the composition includes from about 0.5 wt % to about 1.5 wt % titanium. In some embodiments, the composition includes from about 0.6 wt % to about 0.9 wt % titanium.

In some embodiments, the composition includes at least about 0.5 wt % Ti, at least about 0.55 wt % Ti, at least about 0.6 wt % Ti, at least about 0.65 wt % Ti, at least about 0.7 wt % Ti, at least about 0.75 wt % Ti, at least about 0.8 wt % Ti, at least about 0.85 wt % Ti, at least about 0.9 wt % Ti, at least about 0.95 wt % Ti, at least about 1.0 wt % Ti, at least about 1.05 wt % Ti, at least about 1.1 wt % Ti, at least about 1.15 wt % Ti, at least about 1.2 wt % Ti, at least about 1.25 wt % Ti, at least about 1.3 wt % Ti, at least about 1.35 wt % Ti, at least about 1.4 wt % Ti, or at least about 1.45 wt % Ti. In some embodiments, the composition includes at most about 0.55 wt % Ti, at most about 0.6 wt % Ti, at most about 0.65 wt % Ti, at most about 0.7 wt % Ti, at most about 0.75 wt % Ti, at most about 0.8 wt % Ti, at most about 0.85 wt % Ti, at most about 0.9 wt % Ti, at most about 0.95 wt % Ti, at most about 1.0 wt % Ti, at most about 1.05 wt % Ti, at most about 1.1 wt % Ti, at most about 1.15 wt % Ti, at most about 1.2 wt % Ti, at most about 1.25 wt % Ti, at most about 1.3 wt % Ti, at most about 1.35 wt % Ti, at most about 1.4 wt % Ti, at most about 1.45 wt % Ti, or at most about 1.5 wt % Ti.

In some embodiments, the composition may include any suitable amount of molybdenum (Mo) that facilitates the composition described herein. In some embodiments, the composition does not include Mo. In some embodiments, the composition includes Mo. In some embodiments, the composition includes from about 0.4 wt % to about 0.6 wt % molybdenum.

In some embodiments, the composition includes at least about 0.4 wt % Mo, at least about 0.45 wt % Mo, at least about 0.5 wt % Mo, or at least about 0.55 wt % Mo. In some embodiments, the composition includes at most about 0.45 wt % Mo, at most about 0.5 wt % Mo, at most about 0.55 wt % Mo, or at most about 0.6 wt % Mo.

In some embodiments, the composition may include any suitable amount of boron (B) that facilitates the composition described herein. In some embodiments, the composition does not include B. In some embodiments, the composition includes B. In some embodiments, the composition includes from about 0.01 wt % to about 0.05 wt % B. In some embodiments, the composition includes from about 0.01 wt % to about 0.03 wt % B.

In some embodiments, the composition includes at least about 0.01 wt % B, at least about 0.015 wt % B, at least about 0.02 wt % B, at least about 0.025 wt % B, at least about 0.03 wt % B, at least about 0.035 wt % B, at least about 0.04 wt % B, or at least about 0.045 wt % B. In some embodiments, the composition includes at most about 0.015 wt % B, at most about 0.02 wt % B, at most about 0.025 wt % B, at most about 0.03 wt % B, at most about 0.035 wt % B, at most about 0.04 wt % B, at most about 0.045 wt % B, or at most about 0.05 wt % B.

In some embodiments, the composition may include any suitable amount of zirconium (Zr) that facilitates the composition described herein. In some embodiments, the composition does not include Zr. In some embodiments, the composition includes Zr. In some embodiments, the composition includes from about 0.005 wt % to about 0.1 wt % Zr. In some embodiments, the composition includes from about 0.005 wt % to about 0.05 wt % Zr.

In some embodiments, the composition includes at least about 0.005 wt % Zr, at least about 0.01 wt % Zr, at least about 0.015 wt % Zr, at least about 0.02 wt % Zr, at least about 0.025 wt % Zr, at least about 0.03 wt % Zr, at least about 0.035 wt % Zr, at least about 0.04 wt % Zr, at least about 0.045 wt % Zr, at least about 0.05 wt % Zr, at least about 0.055 wt % Zr, at least about 0.06 wt % Zr, at least about 0.065 wt % Zr, at least about 0.07 wt % Zr, at least about 0.075 wt % Zr, at least about 0.08 wt % Zr, at least about 0.085 wt % Zr, at least about 0.09 wt % Zr, or at least about 0.095 wt % Zr. In some embodiments, the composition includes at most about 0.01 wt % Zr, at most about 0.015 wt % Zr, at most about 0.02 wt % Zr, at most about 0.025 wt % Zr, at most about 0.03 wt % Zr, at most about 0.035 wt % Zr, at most about 0.04 wt % Zr, at most about 0.045 wt % Zr, at most about 0.05 wt % Zr, at most about 0.055 wt % Zr, at most about 0.06 wt % Zr, or at most about 0.065 wt % Zr, at most about 0.07 wt % Zr, at most about 0.075 wt % Zr, at most about 0.08 wt % Zr, at most about 0.085 wt % Zr, at most about 0.09 wt % Zr, at most about 0.095 wt % Zr, or at most about 0.1 wt % Zr.

Generally, the composition may include impurities that do not substantially alter the material properties of the composition. In some embodiments, the composition also includes elemental impurities. In some embodiments, the composition also includes incidental impurities.

In some embodiments, the composition includes balance nickel and incidental impurities. In these embodiments, the amount of nickel and incidental impurities is sufficient to bring the total weight percent of the composition to 100 wt %.

In some embodiments, the composition includes at least about 57.0 wt % Ni, at least about 57.5 wt % Ni, at least about 58 wt % Ni, at least about 58.5 wt % Ni, at least about 59.0 wt % Ni, at least about 59.5 wt % Ni, at least about 60 wt % Ni, at least about 60.5 wt % Ni, at least about 61 wt % Ni, at least about 61.5 wt % Ni, at least about 62 wt % Ni, at least about 62.5 wt % Ni, at least about 63 wt % Ni, at least about 63.5 wt % Ni, at least about 64 wt % Ni, at least about 64.5 wt % Ni, at least about 65 wt % Ni, at least about 65.5 wt % Ni, at least about 66 wt % Ni, at least about 66.5 wt % Ni, or at least about 67 wt % Ni. In some embodiments, the composition includes at most about 57.5 wt % Ni, at most about 58 wt % Ni, at most about 58.5 wt % Ni, at most about 59 wt % Ni, at most about 59.5 wt % Ni, at most about 60 wt % Ni, at most about 60.5 wt % Ni, at most about 61 wt % Ni, at most about 61.5 wt % Ni, at most about 62 wt % Ni, at most about 62.5 wt % Ni, at most about 63 wt % Ni, at most about 63.5 wt % Ni, at most about 64 wt % Ni, at most about 64.5 wt % Ni, at most about 65 wt % Ni, at most about 65.5 wt % Ni, at most about 66 wt % Ni, at most about 66.5 wt % Ni, or at most about 67 wt % Ni.

In some embodiments, the composition may include any suitable amount of niobium (Nb). In some embodiments, the composition does not include Nb. In some embodiments, the composition includes Nb.

In some embodiments, the composition may include any suitable amount of silicon (Si). In some embodiments, the composition does not include Si. In some embodiments, the composition includes Si.

In some embodiments, the composition may include any suitable amount of iron (Fe). In some embodiments, the composition does not include Fe. In some embodiments, the composition includes Fe.

In some embodiments, the composition may include any suitable amount of rhenium (Re). In some embodiments, the composition does not include Re. In some embodiments, the composition includes Re.

In some embodiments, the composition is an alloy composition. In some embodiments, the composition is a superalloy composition.

In some embodiments, the composition may have a solidus temperature that facilitates the use of the composition described herein. In some embodiments, the composition has a solidus temperature of from about 2380° F. to about 2460° F.

In some embodiments, the composition has a solidus temperature of at least 2380° F., at least about 2390° F., at least about 2400° F., at least about 2410° F., at least about 2420° F., at least about 2430° F., at least about 2440° F., at least about 2450° F., at least about 2460° F., at least about 2470° F., or at least about 2475° F. In some embodiments, the composition has a solidus temperature of at most about 2385° F., at most about 2390° F., at most about 2400° F., at most about 2410° F., at most about 2420° F., at most about 2430° F., at most about 2440° F., at most about 2450° F., at most about 2460° F., at most about 2470, at most about 2475° F., or at most about 2480° F.

In some embodiments, the composition may have a rupture stress at a temperature in a kilo-pound per square inch (KSI) range that facilitates the use of the composition described herein. In some embodiments, the composition has a rupture stress at a temperature of from about 1200° F. in a range of from about 87 KSI to about 94 KSI.

In some embodiments, the composition has a rupture stress temperature at 1200° F. in a range of from about at least 77 KSI, at least about 82 KSI, at least about 87 KSI, or at least about 92 KSI. In some embodiments, the composition has a rupture stress temperature at 1200° F. in a range of at most about 77 KSI, at most about 82 KSI, at most 87 KSI, or at most 92 KSI.

In some embodiments, the composition may have a solidification window that facilitates the use of the composition described herein. In some embodiments, the composition has solidification window greater than 55° F.

Generally, the composition may be used according to any suitable purpose known in the art that facilitates the use of the composition described herein. Many compositions according to the present disclosure are useful for high temperature applications.

In some embodiments, the composition is a welding composition, an additive manufacturing composition, a metal casting composition, a coating composition, and/or a repair composition. In some embodiments, the composition is used in a welding composition, an additive manufacturing composition, a metal casting composition, a coating composition, a powder metallurgy composition, and/or a repair composition.

Described herein is also a method of using the composition, wherein the method includes using the composition for any of, but not limited to, welding, additive manufacturing, metal casting, coating, repairing, powder metallurgy, and combinations thereof.

Also described herein is an article including the composition. Generally, the composition may be included in any suitable article known in the art that facilitates the use of the composition described herein. In some embodiments, the article is produced using, but not limited to only using, a welding process, an additive manufacturing process, a metal casting process, a coating process, a repair process, powder metallurgy, and combinations thereof.

In some embodiments, the article is a blade for a gas turbine or a squealer tip of a blade of a gas turbine. In some embodiments, the article is a component of a gas turbine such as, but not limited to only being, a nozzle, a shroud, a diaphragm, a splash plate, a combustor component, and/or a combination thereof.

Further aspects of the present disclosure are provided by the subject matter of the following clauses:

1. A composition including:
from about 0.2 wt % to about 0.7 wt % hafnium;
from about 4.0 wt % to about 5.5 wt % tantalum;
from about 8 wt % to about 10 wt % tungsten;
from about 0.06 wt % to about 0.1 wt % carbon;
one or more of cobalt, chromium, aluminum, titanium, molybdenum, boron, and zirconium; and
balance nickel and incidental impurities.

2. The composition of clause 1, wherein the composition comprises from about 0.3 wt % to about 0.5 wt % hafnium.

3. The composition of clause 1, wherein the composition comprises from about 4 wt % to about 5.0 wt % tantalum.

4. The composition of clause 1, wherein the composition comprises from about 8.5 wt % to about 9.7 wt % tungsten.

5. The composition of clause 1, wherein the composition comprises from about 0.07 wt % to about 0.09 wt % carbon.

6. The composition of clause 1, wherein the composition comprises from about 0.3 wt % to about 0.5 wt % hafnium, from about 4.0 wt % to about 5.0 wt % tantalum, from about 8.5 wt % to about 9.7 wt % tungsten, and from about 0.07 wt % to about 0.09 wt % carbon.

7. The composition of clause 1, wherein the composition does not comprise niobium.

8. The composition of clause 1, wherein the composition comprises one or more of:
from about 9 wt % to about 10 wt % cobalt;
from about 8 wt % to about 8.7 wt % chromium;
from about 5.25 wt % to about 5.75 wt % aluminum;
from about 0.5 wt % to about 1.5 wt % titanium;
from about 0.4 wt % to about 0.6 wt % molybdenum;
from about 0.01 wt % to about 0.05 wt % boron; and
from about 0.005 wt % to about 0.1 wt % zirconium.

9. The composition of clause 1, including:
from about 0.2 wt % to about 0.7 wt % hafnium;
from about 4.0 wt % to about 5.5 wt % tantalum;
from about 8 wt % to about 10 wt % tungsten;
from about 0.06 wt % to about 0.1 wt % carbon;
from about 9 wt % to about 10 wt % cobalt;
from about 8 wt % to about 8.7 wt % chromium;
from about 5.25 wt % to about 5.75 wt % aluminum;
from about 0.5 wt % to about 1.5 wt % titanium;
from about 0.4 wt % to about 0.6 wt % molybdenum;
from about 0.01 wt % to about 0.05 wt % boron;
from about 0.005 wt % to about 0.1 wt % zirconium; and
balance nickel and incidental impurities.

10. The composition of clause 1, including:
from about 0.3 wt % to about 0.5 wt % hafnium;
from about 4.0 wt % to about 5.0 wt % tantalum;
from about 8.5 wt % to about 9.7 wt % tungsten;
from about 0.07 wt % to about 0.09 wt % carbon;
from about 9 wt % to about 10 wt % cobalt;
from about 8 wt % to about 8.7 wt % chromium;
from about 5.25 wt % to about 5.75 wt % aluminum;
from about 0.6 wt % to about 0.9 wt % titanium;
from about 0.4 wt % to about 0.6 wt % molybdenum;
from about 0.01 wt % to about 0.03 wt % boron;
from about 0.005 wt % to about 0.05 wt % zirconium; and
balance nickel and incidental impurities.

11. The composition of clause 1, consisting of:
from about 0.3 wt % to about 0.5 wt % hafnium;
from about 4.0 wt % to about 5.0 wt % tantalum;
from about 8.5 wt % to about 9.7 wt % tungsten;
from about 0.07 wt % to about 0.09 wt % carbon;
from about 9 wt % to about 10 wt % cobalt;
from about 8 wt % to about 8.7 wt % chromium;
from about 5.25 wt % to about 5.75 wt % aluminum;
from about 0.6 wt % to about 0.9 wt % titanium;
from about 0.4 wt % to about 0.6 wt % molybdenum;
from about 0.01 wt % to about 0.03 wt % boron;
from about 0.005 wt % to about 0.05 wt % zirconium; and
balance nickel and incidental impurities.

12. The composition of clause 1, wherein the composition has a solidus temperature in a range of from about 2380° F. to about 2460° F.

13. The composition of clause 1, wherein the composition has solidification window greater than 55° F.

14. The composition of clause 1, wherein the composition is at least one of a welding composition, an additive manufacturing composition, a metal casting composition, a coating composition, and a repair composition.

15. A method of using a composition, the composition including:
from about 0.2 wt % to about 0.7 wt % hafnium;
from about 4.0 wt % to about 5.5 wt % tantalum;
from about 8 wt % to about 10 wt % tungsten;
from about 0.06 wt % to about 0.1 wt % carbon;
one or more of cobalt, chromium, aluminum, titanium, molybdenum, boron, and zirconium; and
balance nickel and incidental impurities,
wherein the method comprises using the composition for a purpose selected from the group consisting of welding, additive manufacturing, metal casting, coating, repairing, powder metallurgy, and combinations thereof.

16. The method of clause 15, wherein the composition comprises from about 0.3 wt % to about 0.5 wt % hafnium, from about 4.0 wt % to about 5.0 wt % tantalum, from about 8.5 wt % to about 9.7 wt % tungsten, and from about 0.07 wt % to about 0.09 wt % carbon.

17. An article including a composition, the composition including:
from about 0.2 wt % to about 0.7 wt % hafnium;
from about 4.0 wt % to about 5.5 wt % tantalum;
from about 8 wt % to about 10 wt % tungsten;
from about 0.06 wt % to about 0.1 wt % carbon;
one or more of cobalt, chromium, aluminum, titanium, molybdenum, boron, and zirconium; and
balance nickel and incidental impurities.

18. The article of clause 17, wherein the article is a blade of a gas turbine or a squealer tip of a blade of a gas turbine.

19. The article of clause 17, wherein the article is a component of a gas turbine selected from the group consisting of a nozzle, a shroud, a diaphragm, a combustor component, and a combination thereof.

20. The article of clause 17, wherein the article is produced with a technique selected from the group consisting of welding, additive manufacturing, metal casting, coating, repairing, powder metallurgy, and combinations thereof.

References to "some embodiments" in the above description are not intended to be interpreted as excluding the existence of additional embodiments that also incorporate the recited features.

Examples

Without further elaboration, it is believed that one skilled in the art using the preceding description can utilize the present invention to its fullest extent. The following Examples are, therefore, to be construed as merely illustrative, and not limiting of the disclosure in any way whatsoever. The starting material for the following Examples may not have necessarily been prepared by a particular preparative run whose procedure is described in other Examples. It also is understood that any numerical range recited herein includes all values from the lower value to the upper value. For example, if a range is stated as 10-50, it is intended that values such as 12-30, 20-40, or 30-50, etc., are expressly enumerated in this specification. These are only examples of what is specifically intended, and all possible combinations of numerical values between and including the lowest value and the highest value enumerated are to be considered to be expressly stated in this application.

Example 1. Simulated Compositions

Compositions according to the present disclosure were simulated. The elemental compositions and their tested properties are shown in the below tables. CE1 and CE2 are comparative examples. IE1, IE2, and IE3 are inventive examples.

For each example, one hundred alloys including chemical compositions within the depicted ranges were generated and evaluated in computational models. This method combined computational thermodynamics with sub-models that estimated design-relevant material properties. This computational approach beneficially avoids the requirement for empirical testing of individual alloy compositions in an alloy design space.

TABLE 1

| Tested compositions. | | | | | |
|---|---|---|---|---|---|
| | Wt (%) | | | | |
| Element | CE1 | CE2 | IE1 | IE2 | IE3 |
| Hf | 1.3-1.7 | 0.9-1.1 | 0.4-0.6 | 0.3-0.5 | 0-1.5 |
| Ta | 2.8-3.3 | 2.8-3.3 | 2.8-3.3 | 4-5 | 3.05-6 |
| W | 9.3-9.7 | 9.3-9.7 | 9.3-9.7 | 8.5-9.7 | 9.5 |
| C | 0.07-0.1 | 0.07-0.1 | 0.07-0.1 | 0.07-0.09 | 0.055-0.085 |
| Co | 9-10 | 9-10 | 9-10 | 9-10 | 9.5 |
| Cr | 8-8.7 | 8-8.7 | 8-8.7 | 8-8.7 | 8.35 |
| Al | 5.25-5.75 | 5.25-5.75 | 5.25-5.75 | 5.25-5.75 | 5.5 |
| Ti | 0.6-0.9 | 0.6-0.9 | 0.6-0.9 | 0.6-0.9 | 0.75 |
| Mo | 0.4-0.6 | 0.4-0.6 | 0.4-0.6 | 0.4-0.6 | 0.5 |
| B | 0.01-0.02 | 0.01-0.02 | 0.01-0.02 | 0.01-0.03 | 0.015 |
| Zr | 0.005-0.02 | 0.005-0.02 | 0.005-0.02 | 0.005-0.05 | 0.0125 |
| Ni | balance | balance | balance | balance | balance |
| Total | 100 | 100 | 100 | 100 | 100 |

The evaluated physical properties of these compositions are depicted in FIGS. 1A-5B. It was discovered that the evaluated compositions including relatively low amounts of hafnium had comparable or improved properties compared to the evaluated compositions including relatively high amounts of hafnium.

When considering modifications to hafnium content, multiple characteristics could be considered, including castability, mechanical properties, physical properties, and economics. As such, a multi-objective machine learning optimization framework has been utilized to design an alloy with superior cost, producibility, and performance.

Hafnium plays a powerful role in investment casting due to its ability to promote strong dendrite growth and its propensity to form fine metal-carbon (MC) carbides during the solidification process. These two elements allow for large investment castings with minimal internal defects and MC carbides that aid in avoiding hot tearing in high stress regions of the casting.

The exemplary compositions and comparative compositions and compositions of the present disclosure disclose alloys designed by using multi-objective optimizations to consider the critical role of hafnium in casting, the benefits of the MC carbide in mechanical properties, required physical properties, and the overall superalloy cost.

Example 2. Calculated Solidification Window Temperatures

FIG. 1A-1D depicts the response of the liquidus temperature minus the solidus temperature, described as the solidification window, to reductions in hafnium in IE3. The effect of carbon reductions and tantalum increases on solidification window are illustrated to show the design space for effecting the critical castability metric of solidification window. Solidification Windows were calculated using the CALPHAD approach with Thermocalc 2023, using the Thermotech database TTNi-8

Example 3. Calculated Normalized Solidus Temperatures

FIG. 2A-2D depicts the response of the solidus temperature to reductions in hafnium in IE3. The effect of carbon reductions and tantalum increases on the solidus temperature are illustrated to show design space for effecting the critical castability metric of solidus. Solidus temperatures were calculated using the CALPHAD approach with Thermocalc 2023, using the Thermotech database TTNi-8.

Metal-Carbon Carbide Constituents at 1600° F.

Figure 3A:
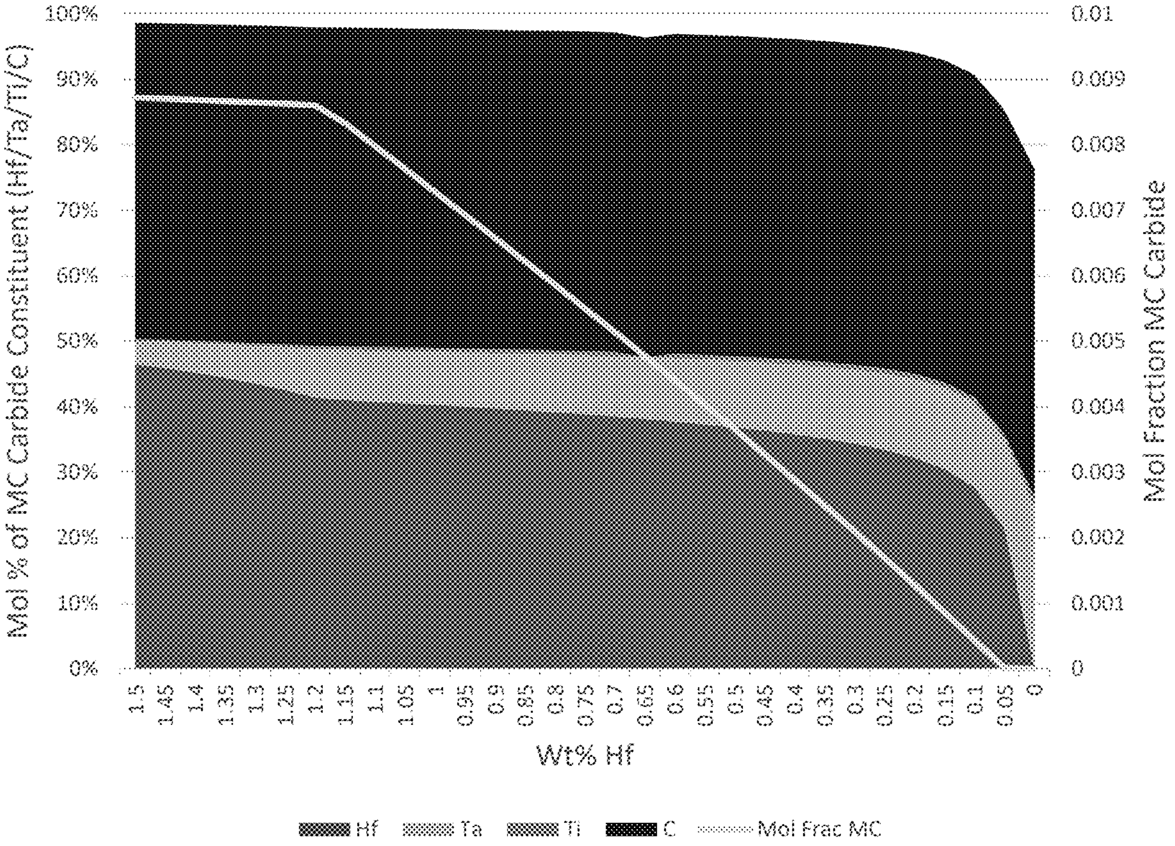
FIG. 3A depicts exemplary results of a computational evaluation at 1600° F. of mol % of metal-carbon carbide compositions for wt % hafnium and nominal tantalum and nominal carbon comparative compositions and compositions in accordance with the present disclosure.
Figure 3B:
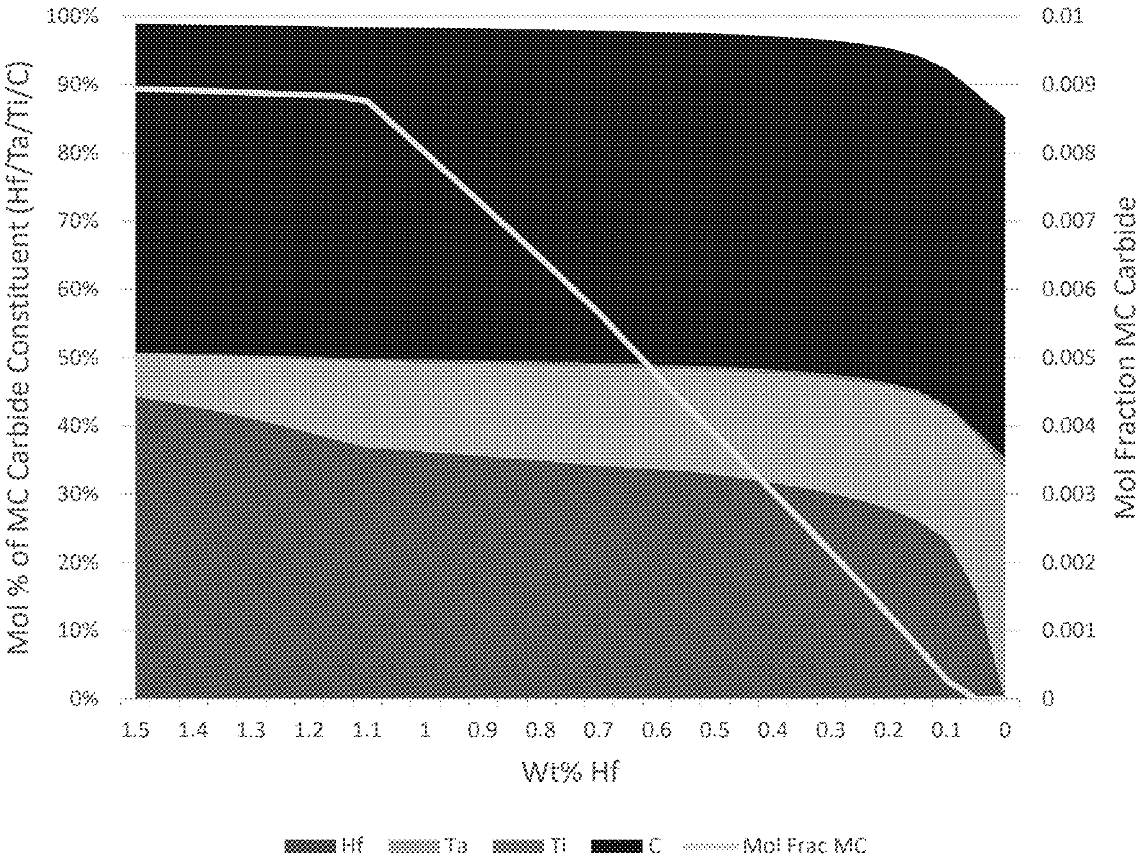
FIG. 3B depicts exemplary results of a computational evaluation at 1600° F. of mol % of metal-carbon carbide compositions for wt % hafnium and 3 wt % tantalum and nominal carbon comparative compositions and compositions in accordance with the present disclosure.
Figure 3C:
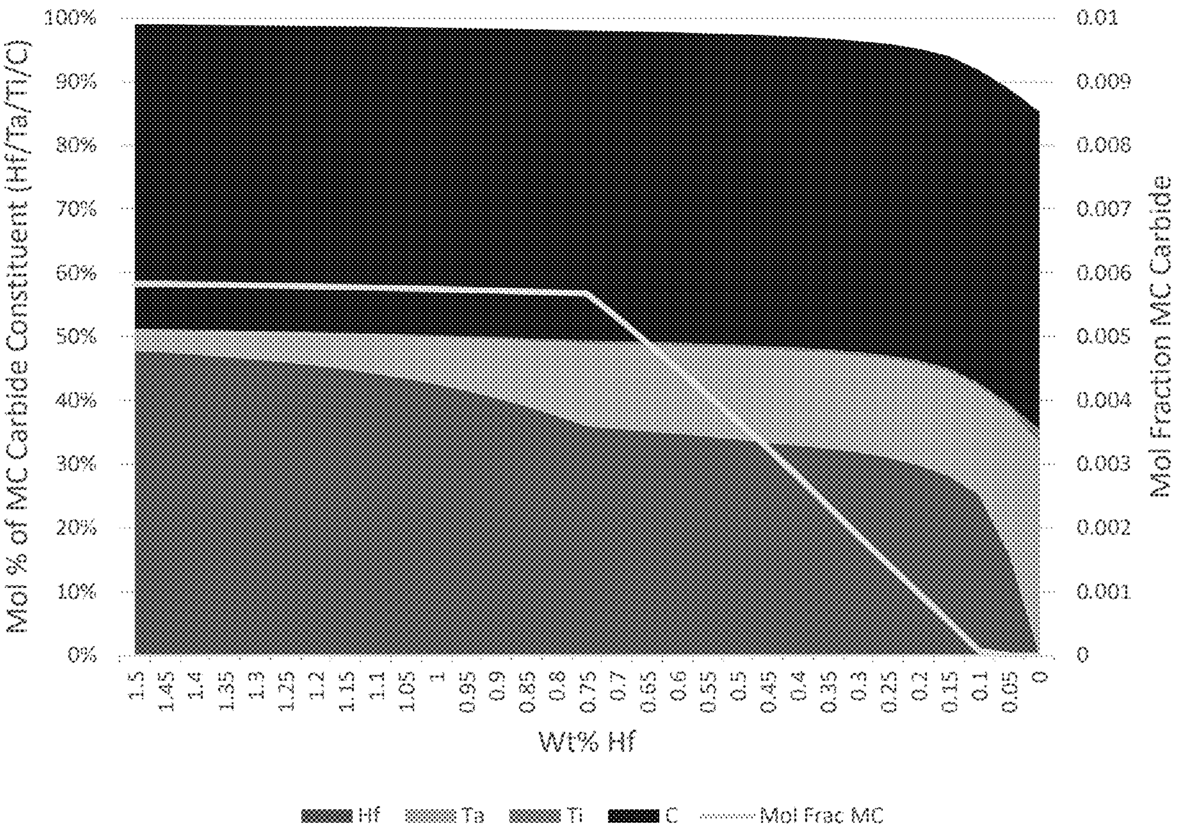
FIG. 3C depicts exemplary results of a computational evaluation at 1600° F. of mol % of metal-carbon carbide compositions for wt % hafnium and 3 wt % tantalum and 0.3 wt % carbon decrease comparative compositions and compositions in accordance with the present disclosure.

FIG. 3A-3C depicts the response of the metal-carbon carbide mol fraction and composition at 1600° F., to reductions in hafnium in IE3. The effect of carbon reductions and tantalum increases on solidification window are illustrated to show the design space for effecting the critical mechanical property metric of metal-carbon carbide mol fraction and composition. Metal-carbon carbide mol fraction and composition at 1600° F. were calculated using the CALPHAD approach with Thermocalc 2023, using the Thermotech database TTNi-8.

Metal-Carbon Carbide Morphology.

Figure 4A:
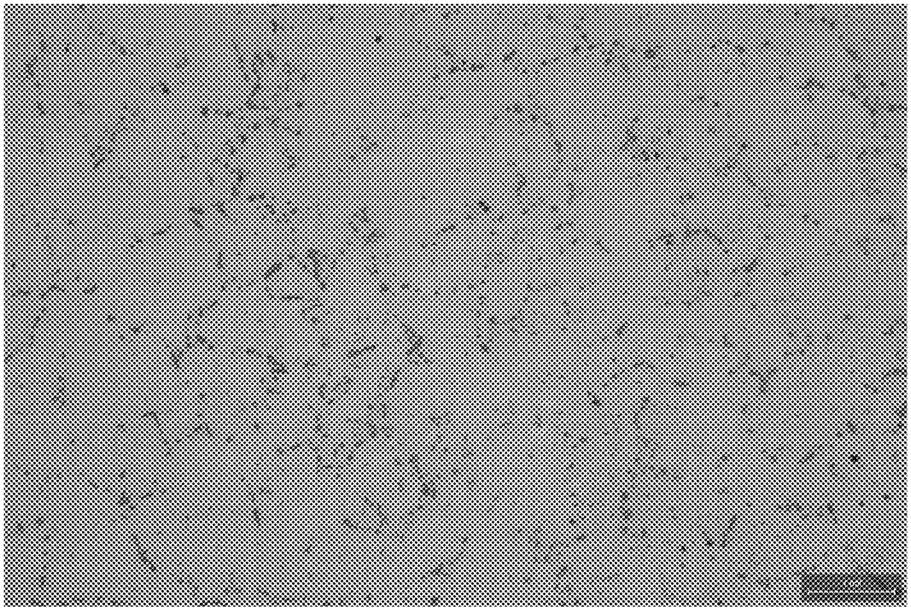
FIG. 4A depicts an exemplary comparative composition of a carbide morphology of a nominal hafnium alloy in accordance with the present disclosure.
Figure 4B:
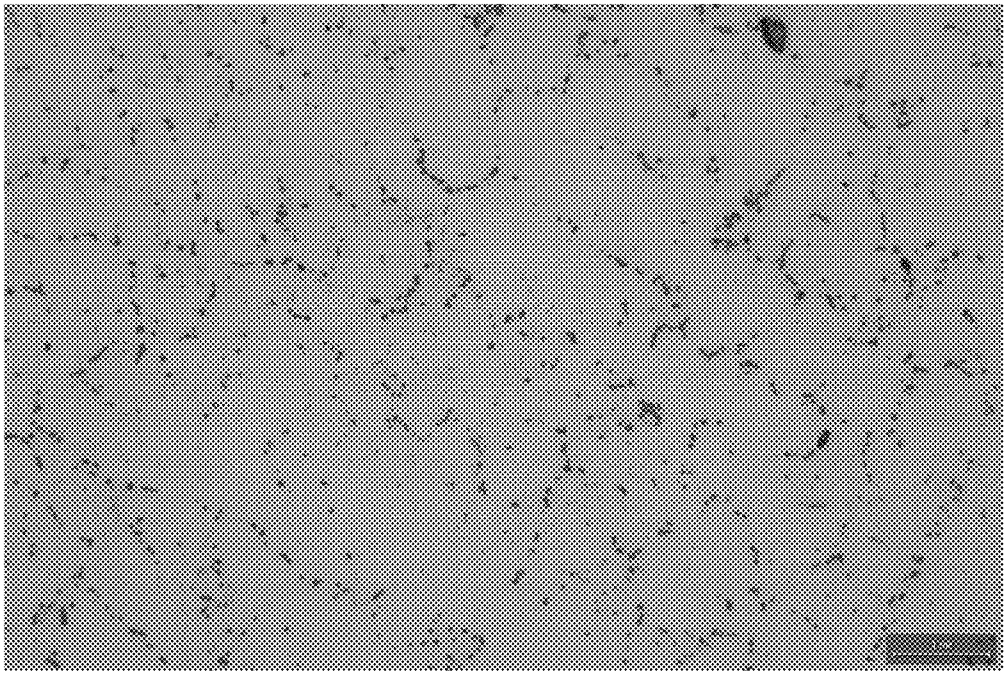
FIG. 4B depicts an exemplary comparative composition of a carbide morphology of a nominal hafnium alloy with approximately 1 wt % reduction in hafnium in accordance with the present disclosure.
Figure 4C:
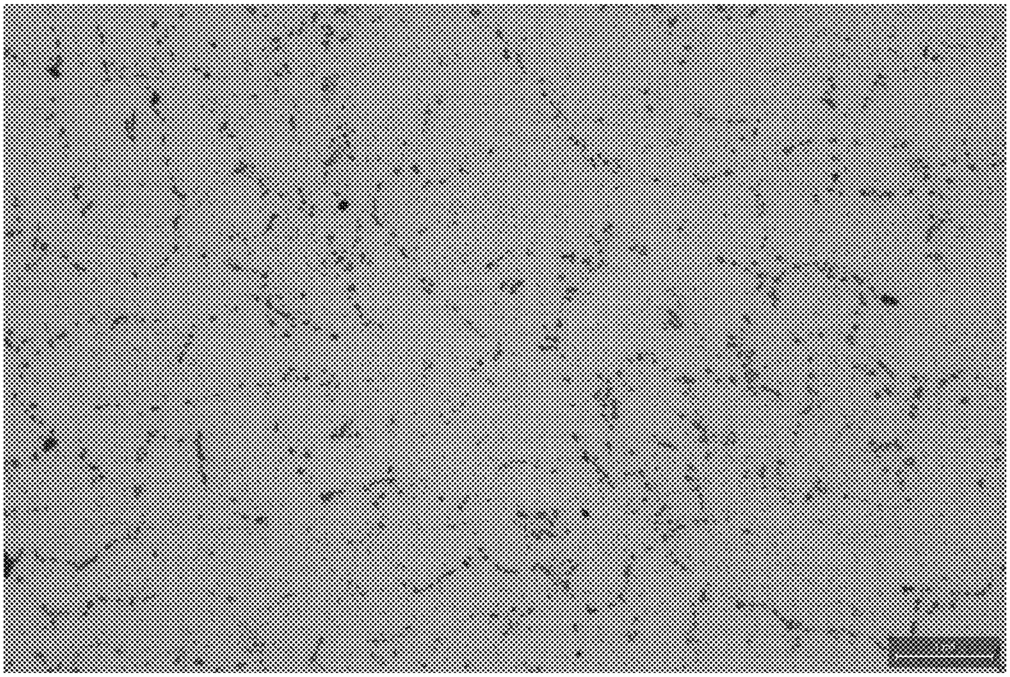
FIG. 4C depicts an exemplary comparative composition following a typical solution and aging heat treatment in accordance with the present disclosure.

FIG. 4A-4C depicts exemplary results for comparative compositions and compositions in accordance with the present disclosure. The carbide morphology of IE3 alloy is shown in FIG. 4A. A nominal IE3 alloy with an approximately 1 weight % reduction in hafnium is shown in FIG. 4B. A configuration of the present disclosure in FIG. 4C following a typical solution and aging heat treatment. The beneficial fine-metal-carbon carbides are observed at higher fractions in the present disclosure than the IE3 alloy and Hf-reduced IE3 alloy.

Mechanical Property Predictions.

Figure 5A:
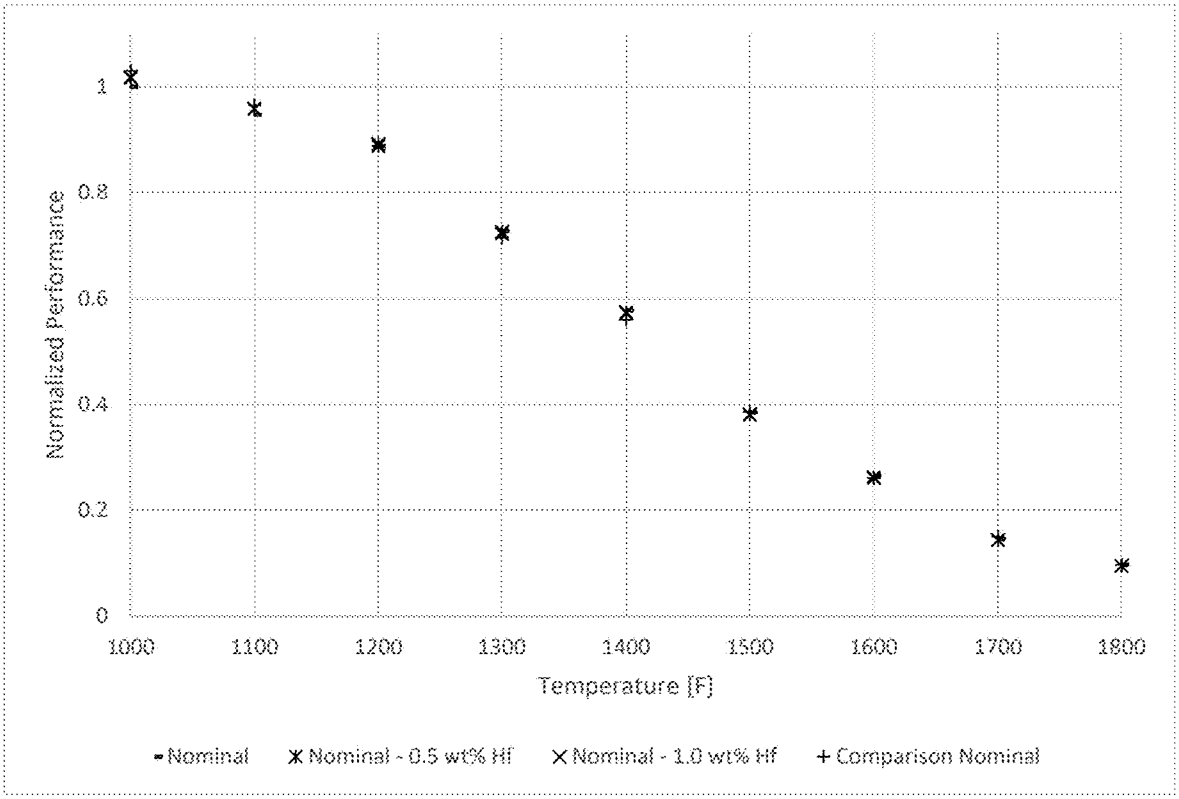
FIG. 5A depicts exemplary results of a computational evaluation of performance over a variety of temperatures for compositions in creep rupture for 10,000 hours in accordance with the present disclosure.
Figure 5B:
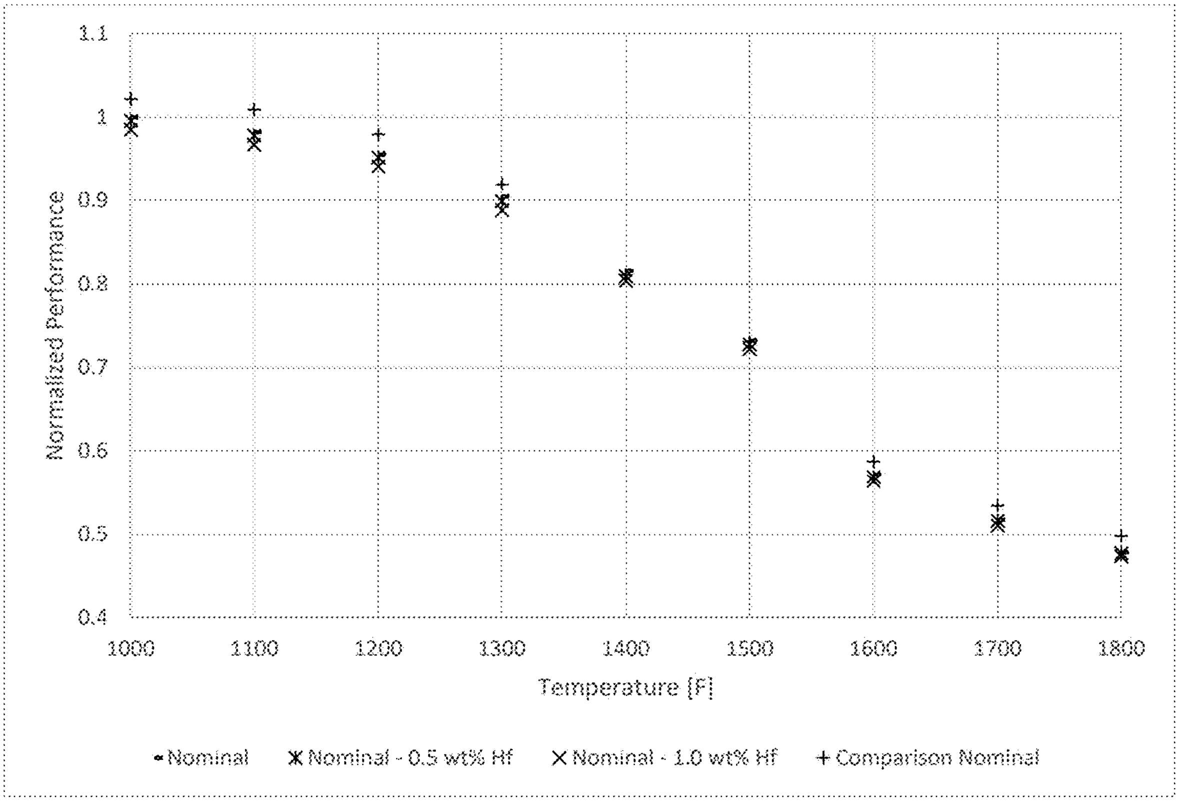
FIG. 5B depicts exemplary results of a computational evaluation of performance over a variety of temperatures for compositions in hold time low cycle fatigue in accordance with the present disclosure.

FIG. 5A-5B depicts exemplary results for mechanical property predictions across multiple temperatures for comparative and inventive compositions. Comparison Nominal refers to a standard R108 alloy composition. It is shown that compositions according to the present disclosure maintain or increase predicted mechanical property performance throughout the elevated temperature range.

Conclusions.

It was discovered in the present disclosure that compositions according to the present disclosure could be used for high temperature applications. The compositions exhibit excellent physical properties due to a combination of relatively low hafnium content and a mixture of particular Ta, W, and C content. Compositions according to the present disclosure are broadly applicable in applications requiring superalloys, including welding, additive manufacturing, metal casting, coating, repairing, powder metallurgy, and combinations thereof.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Although specific features of various embodiments of the invention may be shown in some drawings and not in others, this is for convenience only. Moreover, references to "some embodiments" in the above description are not intended to be interpreted as excluding the existence of additional embodiments that also incorporate the recited features. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A composition comprising:
from about 0.2 wt % to about 0.7 wt % hafnium;
from about 4.0 wt % to about 5.5 wt % tantalum;
from about 8 wt % to about 10 wt % tungsten;
from about 0.06 wt % to about 0.1 wt % carbon;
from about 9 wt % to about 10 wt % cobalt;
from about 8 wt % to about 8.7 wt % chromium;
from about 5.25 wt % to about 5.75 wt % aluminum;
from about 0.5 wt % to about 1.5 wt % titanium;
from about 0.4 wt % to about 0.6 wt % molybdenum;
from about 0.01 wt % to about 0.05 wt % boron;
from about 0.005 wt % to about 0.1 wt % zirconium; and
balance nickel and incidental impurities;
wherein:
the composition has a solidus temperature in a range of from about 2380° F. to about 2460° F.; and/or
the composition has solidification window greater than 55° F.

2. The composition of claim 1, wherein the composition comprises from about 0.3 wt % to about 0.5 wt % hafnium.

3. The composition of claim 1, wherein the composition comprises from about 4 wt % to about 5.0 wt % tantalum.

4. The composition of claim 1, wherein the composition comprises from about 8.5 wt % to about 9.7 wt % tungsten.

5. The composition of claim 1, wherein the composition comprises from about 0.07 wt % to about 0.09 wt % carbon.

6. The composition of claim 1, wherein the composition comprises from about 0.3 wt % to about 0.5 wt % hafnium, from about 4.0 wt % to about 5.0 wt % tantalum, from about 8.5 wt % to about 9.7 wt % tungsten, and from about 0.07 wt % to about 0.09 wt % carbon.

7. The composition of claim 1, wherein the composition does not comprise niobium.

8. The composition of claim 1, comprising:
from about 0.3 wt % to about 0.5 wt % hafnium;
from about 4.0 wt % to about 5.0 wt % tantalum;
from about 8.5 wt % to about 9.7 wt % tungsten;
from about 0.07 wt % to about 0.09 wt % carbon;
from about 9 wt % to about 10 wt % cobalt;
from about 8 wt % to about 8.7 wt % chromium;
from about 5.25 wt % to about 5.75 wt % aluminum;
from about 0.6 wt % to about 0.9 wt % titanium;
from about 0.4 wt % to about 0.6 wt % molybdenum;
from about 0.01 wt % to about 0.03 wt % boron;
from about 0.005 wt % to about 0.05 wt % zirconium; and
balance nickel and incidental impurities.

9. The composition of claim 1, consisting of:
from about 0.3 wt % to about 0.5 wt % hafnium;
from about 4.0 wt % to about 5.0 wt % tantalum;
from about 8.5 wt % to about 9.7 wt % tungsten;
from about 0.07 wt % to about 0.09 wt % carbon;
from about 9 wt % to about 10 wt % cobalt;
from about 8 wt % to about 8.7 wt % chromium;
from about 5.25 wt % to about 5.75 wt % aluminum;
from about 0.6 wt % to about 0.9 wt % titanium;
from about 0.4 wt % to about 0.6 wt % molybdenum;
from about 0.01 wt % to about 0.03 wt % boron;
from about 0.005 wt % to about 0.05 wt % zirconium; and
balance nickel and incidental impurities.

10. The composition of claim 1, wherein the composition is at least one of a welding composition, an additive manufacturing composition, a metal casting composition, a coating composition, and a repair composition.

11. A method of using a composition, the composition comprising:
from about 0.2 wt % to about 0.7 wt % hafnium;
from about 4.0 wt % to about 5.5 wt % tantalum;
from about 8 wt % to about 10 wt % tungsten;
from about 0.06 wt % to about 0.1 wt % carbon;
from about 9 wt % to about 10 wt % cobalt;
from about 8 wt % to about 8.7 wt % chromium;
from about 5.25 wt % to about 5.75 wt % aluminum;
from about 0.5 wt % to about 1.5 wt % titanium;
from about 0.4 wt % to about 0.6 wt % molybdenum;
from about 0.01 wt % to about 0.05 wt % boron;
from about 0.005 wt % to about 0.1 wt % zirconium; and
balance nickel and incidental impurities,
wherein:
the composition has a solidus temperature in a range of from about 2380° F. to about 2460° F.; and/or
the composition has solidification window greater than 55° F.;
wherein the method comprises using the composition for a purpose selected from the group consisting of welding, additive manufacturing, metal casting, coating, repairing, powder metallurgy, and combinations thereof.

12. The method of claim 11, wherein the composition comprises from about 0.3 wt % to about 0.5 wt % hafnium, from about 4.0 wt % to about 5.0 wt % tantalum, from about 8.5 wt % to about 9.7 wt % tungsten, and from about 0.07 wt % to about 0.09 wt % carbon.

13. An article comprising a composition, the composition comprising:
from about 0.2 wt % to about 0.7 wt % hafnium;

from about 4.0 wt % to about 5.5 wt % tantalum;
from about 8 wt % to about 10 wt % tungsten;
from about 0.06 wt % to about 0.1 wt % carbon;
from about 9 wt % to about 10 wt % cobalt;
from about 8 wt % to about 8.7 wt % chromium;
from about 5.25 wt % to about 5.75 wt % aluminum;
from about 0.5 wt % to about 1.5 wt % titanium;
from about 0.4 wt % to about 0.6 wt % molybdenum;
from about 0.01 wt % to about 0.05 wt % boron;
from about 0.005 wt % to about 0.1 wt % zirconium; and
balance nickel and incidental impurities;
wherein:
the composition has a solidus temperature in a range of from about 2380° F. to about 2460° F.; and/or
the composition has solidification window greater than 55° F.

14. The article of claim 13, wherein the article is a blade of a gas turbine or a squealer tip of a blade of a gas turbine.

15. The article of claim 13, wherein the article is a component of a gas turbine selected from the group consisting of a nozzle, a shroud, a diaphragm, a combustor component, and a combination thereof.

16. The article of claim 13, wherein the article is produced with a technique selected from the group consisting of welding, additive manufacturing, metal casting, coating, repairing, powder metallurgy, and combinations thereof.

* * * * *